(12) United States Patent
Lee

(10) Patent No.: US 8,854,315 B2
(45) Date of Patent: Oct. 7, 2014

(54) DISPLAY DEVICE HAVING TWO TOUCH SCREENS AND A METHOD OF CONTROLLING THE SAME

(75) Inventor: Dohui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 12/604,707

(22) Filed: Oct. 23, 2009

(65) Prior Publication Data

US 2010/0295802 A1 Nov. 25, 2010

(30) Foreign Application Priority Data

May 25, 2009 (KR) ........................ 10-2009-0045317

(51) Int. Cl.
G06F 3/041 (2006.01)
G06F 1/16 (2006.01)
G06F 3/048 (2013.01)

(52) U.S. Cl.
CPC ............ *G06F 1/1643* (2013.01); *G06F 1/1626* (2013.01); *G06F 1/1647* (2013.01); *G06F 3/048* (2013.01)
USPC ....................................................... 345/173

(58) Field of Classification Search
None
See application file for complete search history.

(56) References Cited

U.S. PATENT DOCUMENTS

| | | | | |
|---|---|---|---|---|
| 5,694,150 | A * | 12/1997 | Sigona et al. .................. | 715/856 |
| 2002/0018051 | A1 * | 2/2002 | Singh ............................ | 345/173 |
| 2004/0021681 | A1 | 2/2004 | Liao | |
| 2005/0182924 | A1 * | 8/2005 | Sauve et al. .................... | 713/154 |
| 2006/0197750 | A1 | 9/2006 | Kerr et al. | |
| 2006/0227106 | A1 * | 10/2006 | Hashimoto et al. ............ | 345/157 |
| 2007/0035616 | A1 * | 2/2007 | Lee et al. ...................... | 348/14.16 |
| 2008/0136786 | A1 * | 6/2008 | Lanfermann .................. | 345/173 |
| 2008/0238880 | A1 | 10/2008 | Miwa | |
| 2009/0167696 | A1 * | 7/2009 | Griffin .......................... | 345/169 |
| 2009/0244016 | A1 * | 10/2009 | Casparian et al. ............. | 345/173 |
| 2009/0322690 | A1 * | 12/2009 | Hiltunen et al. ................ | 345/173 |
| 2010/0081475 | A1 * | 4/2010 | Chiang et al. ................. | 455/564 |

FOREIGN PATENT DOCUMENTS

| | | | |
|---|---|---|---|
| EP | 1003098 B1 * | 9/2005 | |
| EP | 2 040 154 | 3/2009 | |
| WO | WO 0054187 A1 * | 9/2000 | |
| WO | WO 2007036762 A1 * | 4/2007 | |

OTHER PUBLICATIONS

European Search Report for Application 09013757.1 dated Jan. 13, 2013.

* cited by examiner

*Primary Examiner* — Alexander S Beck
*Assistant Examiner* — Kirk Hermann
(74) *Attorney, Agent, or Firm* — Ked & Associates, LLP

(57) ABSTRACT

A mobile terminal may include a first touch screen to display a first object, a second touch screen, and a controller to control the first and second touch screens. The mobile terminal may receive a first touch to the first object, and may receive a second touch to a position on the second touch screen while the first touch is held to the first object. The mobile terminal may further display content or information based on the first object on the second touch screen in response to receiving the second touch. Other embodiments may also be provided.

15 Claims, 21 Drawing Sheets

(a)

(b)

(a)

(b)

DISPLAY DEVICE HAVING TWO TOUCH SCREENS AND A METHOD OF CONTROLLING THE SAME

The present application claims priority from Korean Application No. 10-2009-0045317, filed May 25, 2009, the subject matter of which is hereby incorporated by reference.

BACKGROUND

1. Field

Embodiments of the present disclosure may relate to a plurality of touch screens for a mobile terminal and executing operations corresponding to touch inputs respectively applied to the plurality of touch screens.

2. Background

An electronic device including a touch screen may provide both an information inputting function and an information displaying function through the touch screen, and thus a user can conveniently operate the electronic device. The electronic device including a touch screen may provide only a function with respect to a simple operation of the touch screen.

An electronic device including a plurality of logically or physically divided touch screens may provide functions for carrying out various operations of the plurality of touch screens. Accordingly, development of a variety of methods may be needed for controlling an electronic device using the plurality of touch screens.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present disclosure may provide a plurality of touch screens for a mobile terminal and the mobile terminal perform various operations corresponding to touch inputs respectively applied to the plurality of touch screens. Various operations corresponding to touch inputs respectively applied to a plurality of touch screens may be performed, and thus a user can conveniently operate the mobile terminal.

The mobile terminal may include a cellular phone, a smart phone, a laptop computer, a digital broadcasting terminal, personal digital assistants (PDA), a portable multimedia player (PMP), a navigation system and/or so on. In the following description, suffixes "module" and "unit" may be given to components of the mobile terminal in consideration of only facilitation of description and do not have meanings or functions discriminated from each other.

Figure 1:
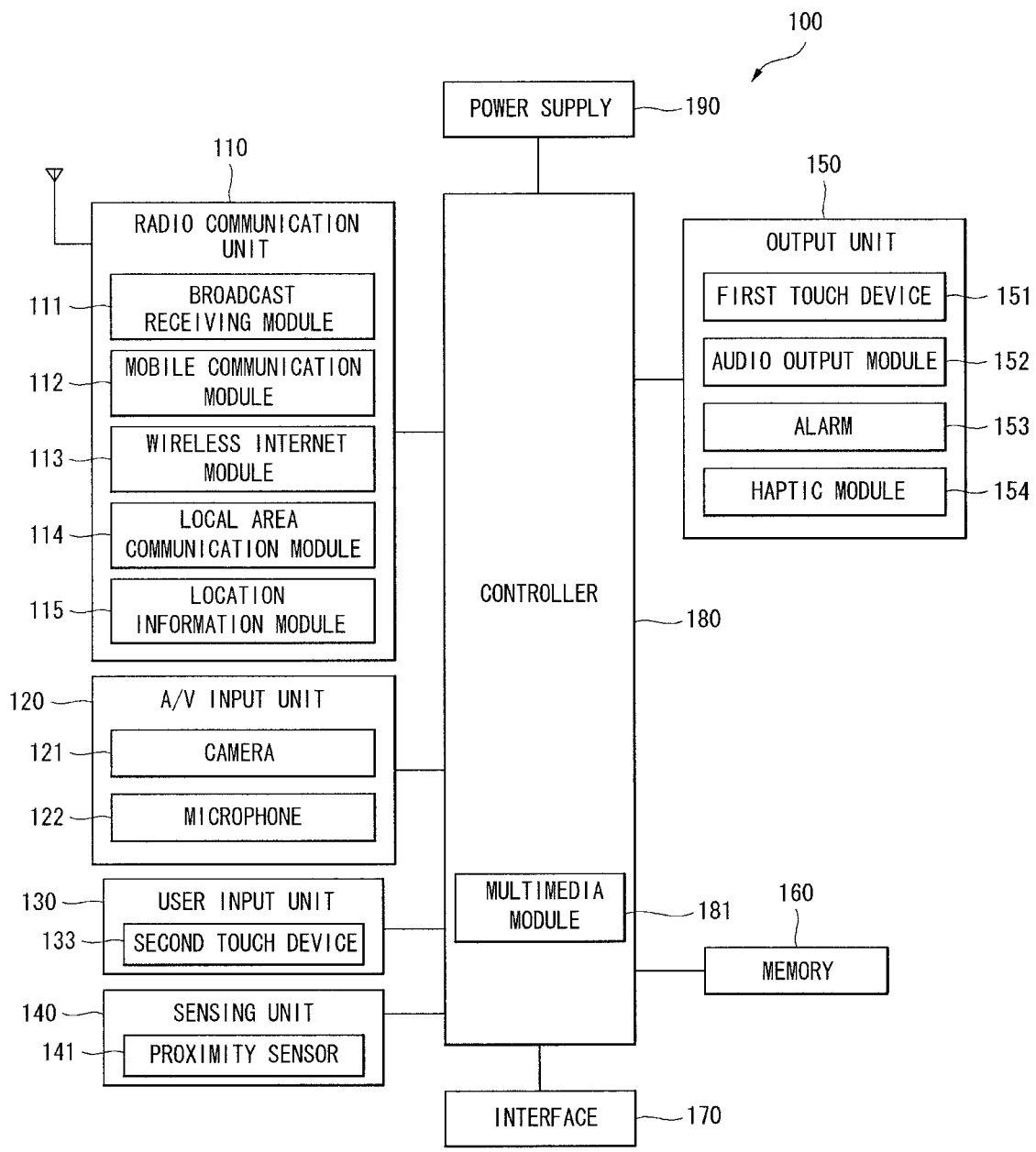
FIG. 1 is a block diagram of a mobile terminal according to an example embodiment.

FIG. 1 is a block diagram of a mobile terminal according to an example embodiment. Other embodiments, configurations and arrangements may also be provided. As shown, a mobile terminal 100 may include a radio communication unit 110, an audio/video (A/V) input unit 120, a user input unit 130, a sensing unit 140, an output unit 150, a memory 160, an interface 170, a controller 180 and a power supply 190.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114 and a location information module 115 (or a position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of the digital multimedia broadcasting (DMB) system or in the form of an electronic service guide (ESG) of the digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems, etc. The broadcasting receiving module 111 may also be constructed to broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. A wireless LAN (WLAN) (Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, bluetooth, radio frequency identification (RFID), infrared data association (IrDA), ultra wideband (UWB) and/or Zig-Bee may be used as a local area communication technique.

The location information module 115 may confirm or obtain the position of the mobile terminal. The position information module 115 may obtain position information by using a global navigation satellite system (GNSS). The GNSS is a terminology describing radio navigation satellite systems that revolve round the earth and transmit reference signals to predetermined types of radio navigation receivers such that the radio navigation receivers can determine their positions on the earth's surface or near the earth's surface. The GNSS may include a global positioning system (GPS) of the United States, Galileo of Europe, global orbiting navigational satellite system (GLONASS) of Russia, COMPASS of China, quasi-zenith satellite system (QZSS) of Japan and so on.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 (or a display unit).

The image frames processed by the camera 121 may be stored in the memory 160 or may be transmitted to an external device through the radio communication unit 110. The mobile terminal 100 may also include at least two cameras.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the terminal from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100 and acceleration/deceleration of the mobile terminal 100, and generate a sensing signal for controlling operation of the mobile terminal 100. For example, the sensing unit 140 may sense whether a slide phone is opened or closed when the mobile terminal 100 is the slide phone. Further, the sensing unit 140 may sense whether the power supply 190 supplies power and/or whether the interface 170 is connected to an external device. The sensing unit 140 may also include a proximity sensor 151.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmission type. That is, the display 151 may include a transparent display.

The transparent display may include a transparent liquid crystal display. The rear structure of the display 151 may also be of a light transmission type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays that are arranged on a single face at a predetermined distance or integrated displays. The plurality of displays may also be arranged on different sides.

In addition, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen may be constructed such that proximity of a pointer is detected through a variation in an electric field according to the proximity of the pointer. The touch screen (touch sensor) may be classified as a proximity sensor.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen to which the pointer touches the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions (e.g., a call signal incoming tone, a message incoming tone, etc.) performed in the mobile terminal 100. The audio output module 152 may include a receiver, a speaker, a buzzer, etc. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, inputting touch, etc. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may also not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data (e.g., phone book, messages, still images, moving images, etc.). The memory 160 may also store data about vibrations and sounds in various patterns that are output from when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc., for example.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

FIGS. 2, 3, 4A and 4B illustrate an external appearance of the mobile terminal 100 according to example embodiments. The mobile terminal 100 may include a first body 101 and a second body 102 that are combined (or connected) with each other through a combining part 195 (or a connecting part). The combining part 195 may be a hinge. As appreciated, the combining part may be a swivel. Alternatively, the first body and the second body may be slidable relative to each other.

The first body 101 and the second body may be combined or connected with each other in various manners. For example, the combining part 195 may combine the first body 101 and the second body with each other in such a manner that the mobile terminal 100 folds the first body 101 relative to the second body 102. Further, the combining part 195 may combine or connect the first body 101 and the second body 102 such that the first body 101 and the second body 102 can slide in opposite directions relative to each other. While the first body 101 and the second body 102 are combined by the combining part 195 in such a manner that the mobile terminal 100 may fold the first body 101 relative to the second body 102, example embodiments are not limited thereto.

Figure 2:
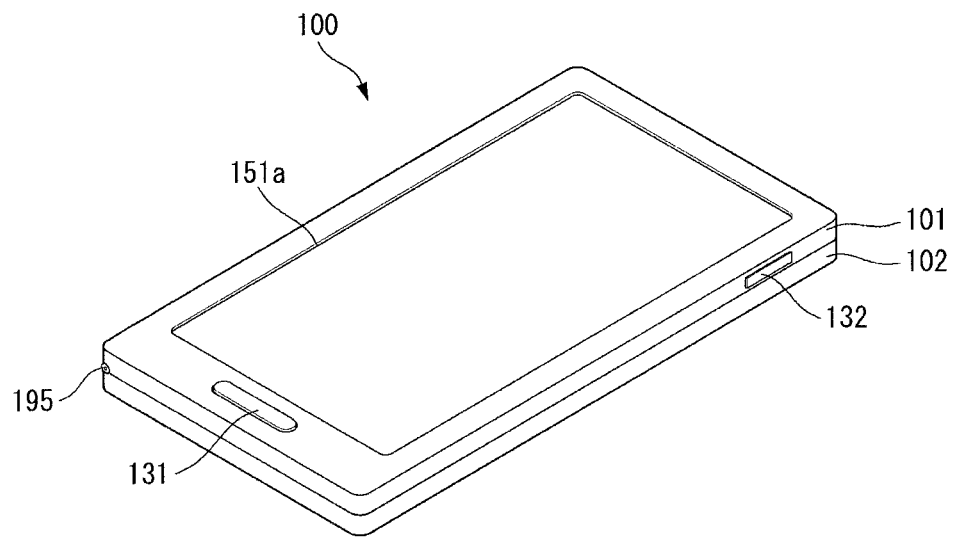
FIGS. 2, 3, 4A and 4B illustrate an external appearance of the mobile terminal according to example embodiments.
Figure 2:
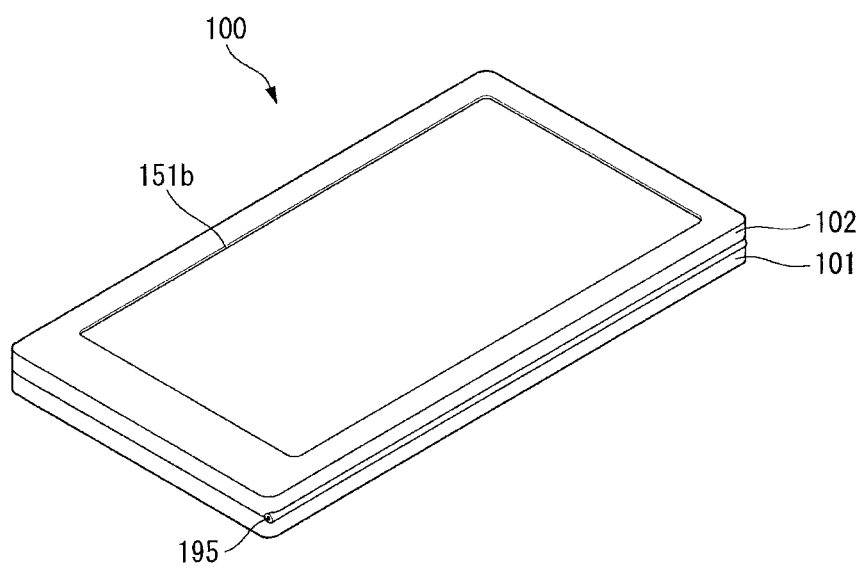
Figure 3:
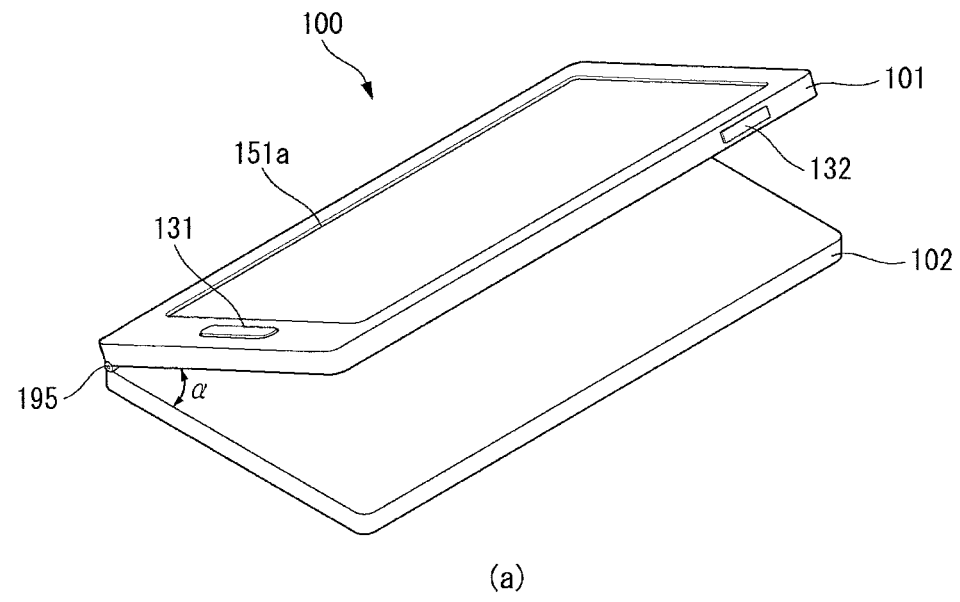
Figure 3:
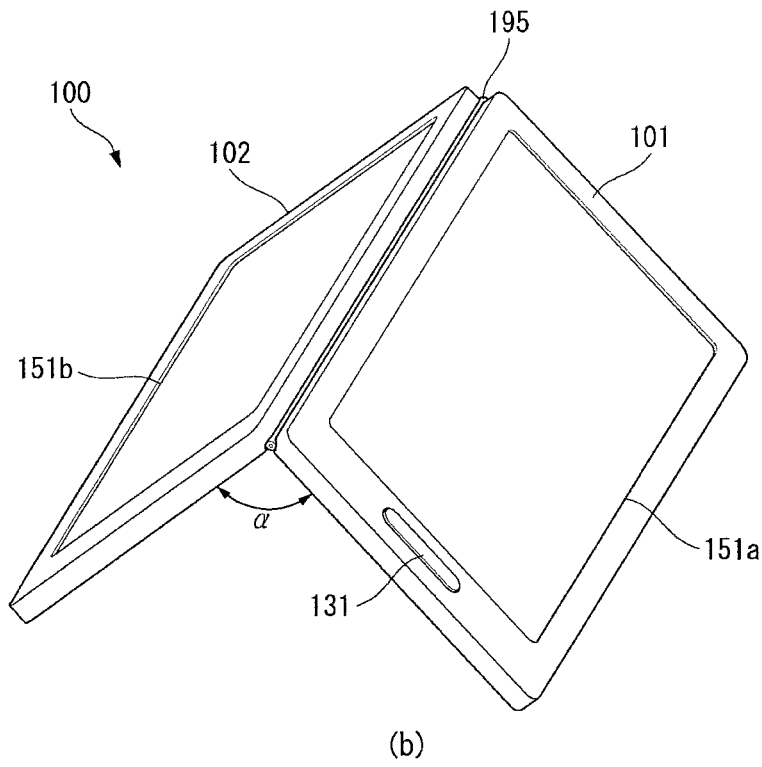
Figure 4A:
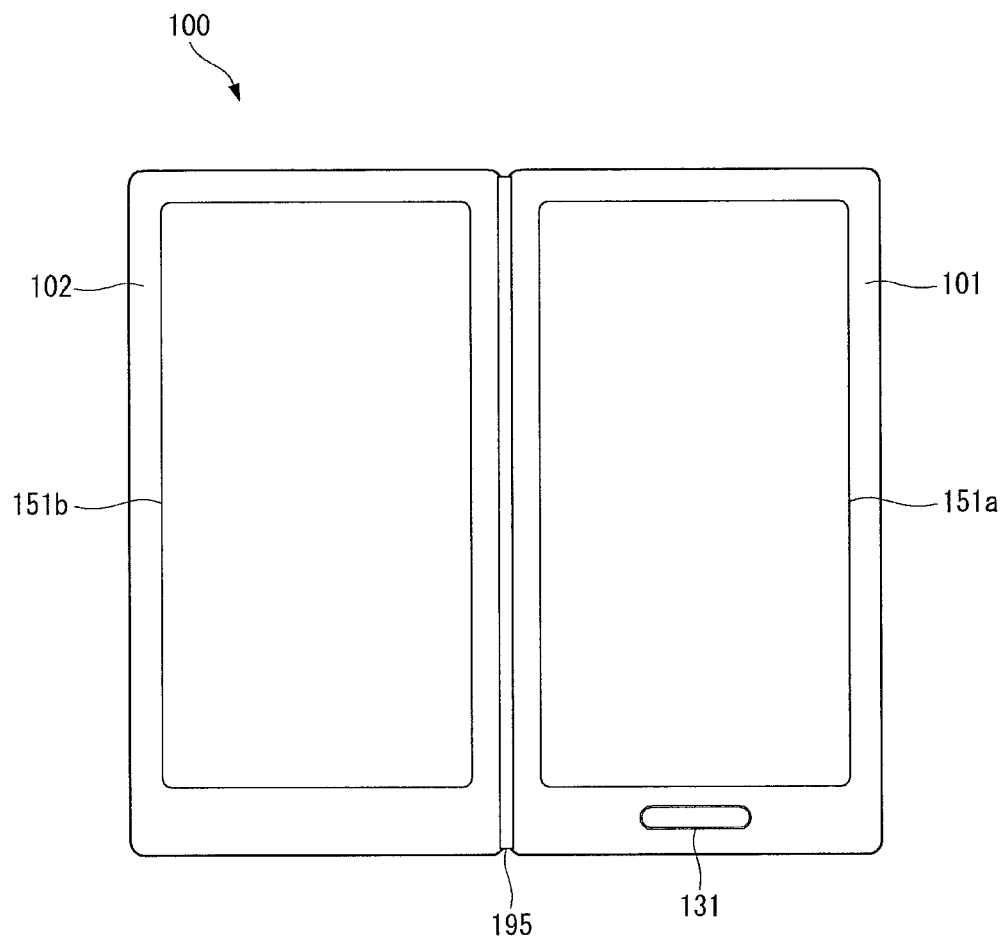
Figure 4B:
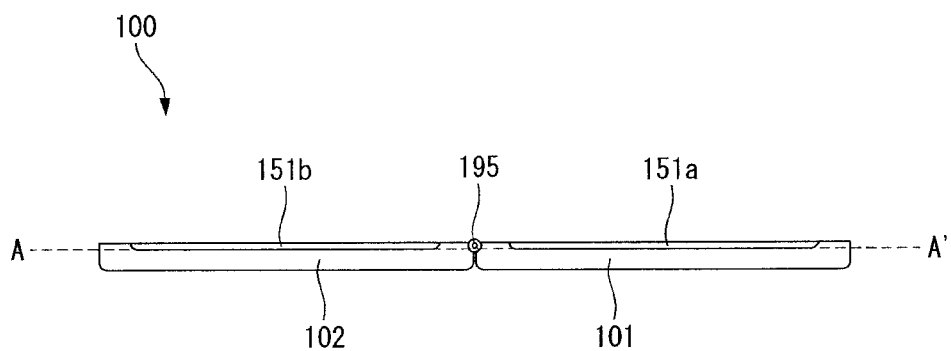

FIG. 2 is a perspective view showing the first body 101 and the second body 102 in a closed status. FIG. 3 is a perspective view showing the first body 101 and the second body 102 in a half open status. FIGS. 4A and 4B are a front view and a side view showing the first body 101 and the second body 102 in a fully open status. The user can open and close the first body 101 and the second body 101, as shown in FIGS. 2, 3, 4A and 4B.

The first body 101 may include a first touch screen 151a and the second body 102 may include a second touch screen 151b. The first and second touch screens 151a and 151b may perform both an information inputting function and an information displaying function. The information inputting function may be implemented in a touching manner.

One side of the first body 101 to which the first touch screen 151a is provided and one side of the second body 102 to which the second touch screen 151b is provided may not come into contact with each other when the first and second bodies 101 and 102 are in the closed status. As shown in FIG. 2, the first and second touch screens 151a and 151b may not come into contact with each other when the first and second bodies 101 and 102 are in the closed status. In this embodiment, the screens 151a and 151b face in opposite directions in a closed state.

One side of the first body 101 to which the first touch screen 151a is provided and one side of the second body 102 to which the second touch screen 151b is provided may be located in a substantially same plane when the first and second bodies 101 and 102 are in the fully open status. As shown in FIG. 4B, the first and second touch screens 151a and may be arranged in a substantially same plane when the first and second bodies 101 and 102 are in the fully open status.

The folding of the mobile terminal 100 using the first body 101 and the second body 102 is not limited to the example shown in FIGS. 4A and 4B. For example, an angle $\alpha$ between the first and second bodies 101 and 102 may be in a range of 0° to 180°, as shown in FIGS. 2, 3, 4A and 4B. The first and second bodies 101 and 102 may be combined by the combining part 195 such that the angle $\alpha$ between the first and second bodies 101 and 102 becomes greater than 180°, but less than 360° such that they do not contact one another.

The controller 180 may sense the open/closed status of the first and second bodies 101 and 102 and the angle $\alpha$ between the first and second bodies 101 and 102 based on the sensing unit 140. The controller 180 may sense the direction of the first touch screen 151a and/or the second touch screen 151b based on the sensing unit 140. As shown in FIG. 4A, the mobile terminal 100 may be provided on a desk such that the first and second touch screens 151a and 151b face the ground or face opposite directions when the angle $\alpha$ between the first and second bodies 101 and 102 is 180°. The controller 180 may sense position or direction of the mobile terminal 100.

The sensing unit 140 may include at least one of a hall sensor, a 3-axis or a 6-axis motion sensor, a terrestrial magnetic sensor and/or an acceleration sensor in order to sense position or direction of the mobile terminal 100.

The mobile terminal 100 may include at least one of a first operating part 131 and a second operating part 132, as shown in FIGS. 2, 3, 4A and 4B. The first and second operating parts 131 and 132 may be operating units as part of the user input unit 130 and correspond to the aforementioned key pad.

The mobile terminal 100 may receive a command for controlling operation of the mobile terminal 100 through at least one of the first and second operating parts 131 and 132. Commands input through the first and second operating parts 131 and 132 may be set in various manners. For example, commands such as start, finish and scroll may be input through the first operating part 131 and a command for adjusting a volume of sound output from the audio output unit 152 and a command for converting the display 151 into the touch recognition mode may be input through the second operating part 132.

Figure 5:
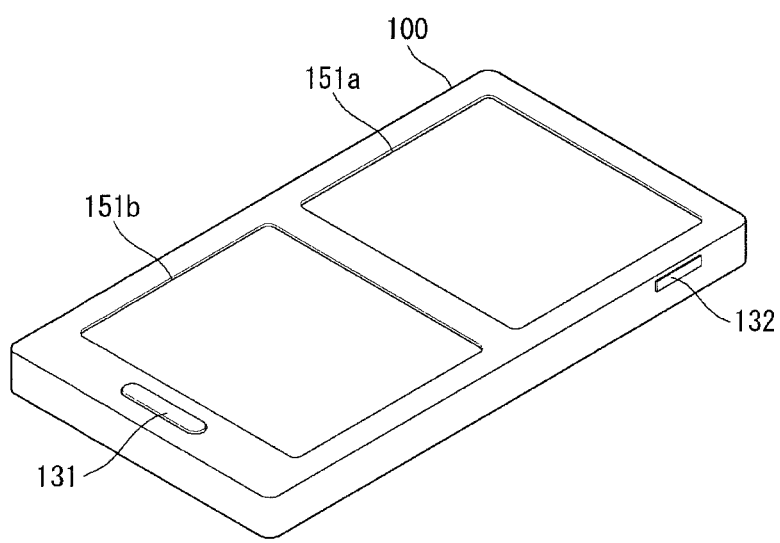
FIG. 5 illustrates a mobile terminal according to another embodiment.

The structure of the mobile terminal 100 is not limited to the examples shown in FIGS. 2, 3, 4A and 4B. FIG. 5 illustrates the mobile terminal 100 in a different structure. As shown in FIG. 5, the mobile terminal 100 may include the first and second touch screens 151a and 151b on a single body.

Figure 6:
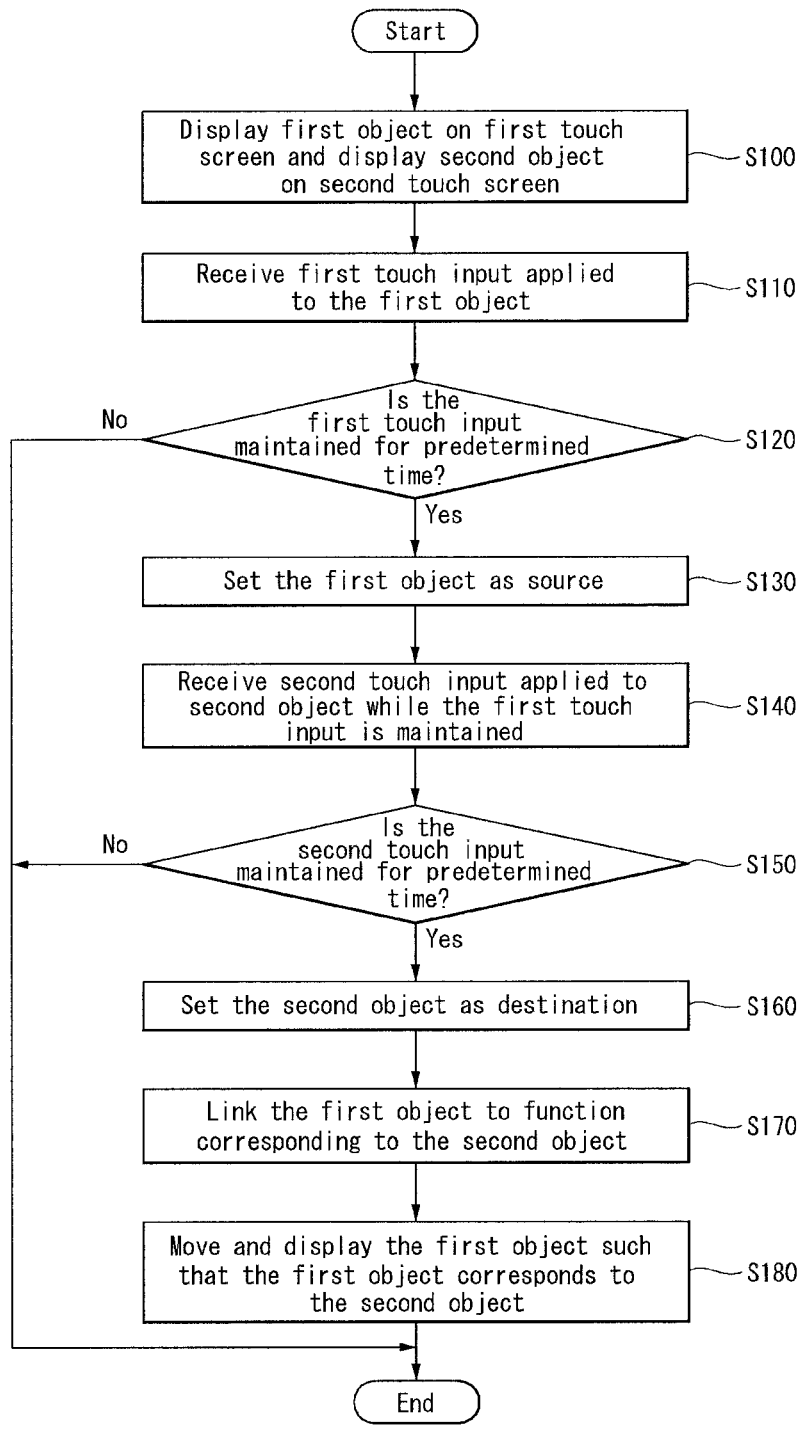
FIG. 6 is a flowchart of a method of controlling a mobile terminal according to a first example embodiment.

FIG. 6 is a flowchart of a method of controlling the mobile terminal according to a first example embodiment of the present disclosure. Other embodiments, configurations, operations and orders of operations are also with the scope of the present disclosure. The controlling method may be performed by the mobile terminal 100.

The controller 180 may display a first object on the first touch screen 151a and display a second object on the second touch screen 151b in operation S100. The first and second objects may be any object that can be displayed on the first and second touch screens 151a and 152b, such as a menu, an icon, contents, specific application, etc. The first and second objects may include a menu, an icon, contents, a specific region and so on that are provided by a specific application when the specific application is executed in the mobile terminal 100.

Figure 7A:
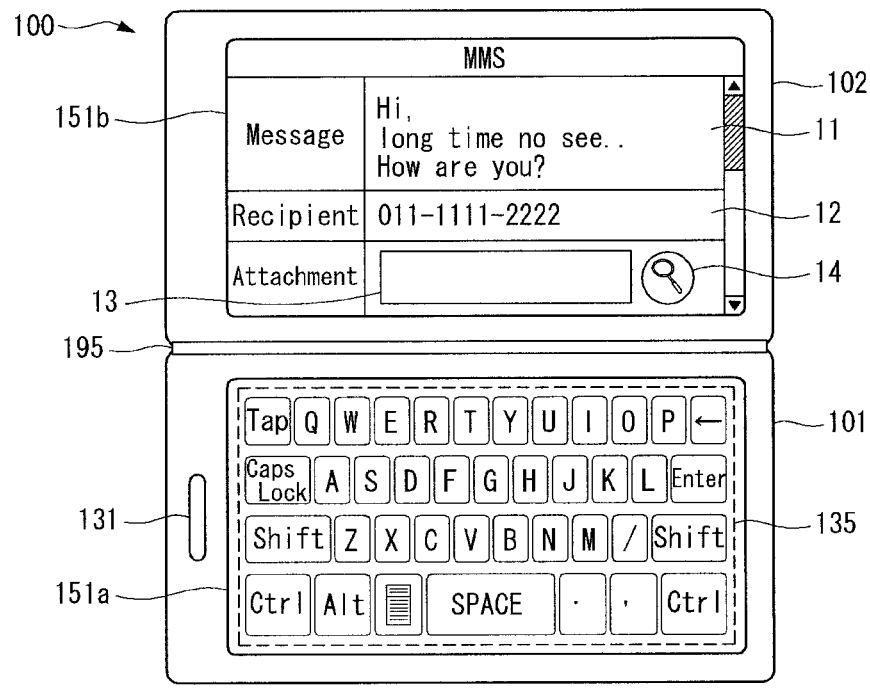
FIGS. 7A through 7E illustrate images displayed on touch screens of the mobile terminal when operation S100 (FIG. 6) is performed.

FIGS. 7A through 7E show images displayed on the mobile terminal 100 when the operation S100 is performed. FIG. 7A shows images displayed on the touch screens 151a and 151b when an application for transmitting a message according to multimedia message service (MMS) is executed by the mobile terminal 100. As shown in FIG. 7A, the controller 180 may display the application for transmitting the message according to MMS on the second touch screen 151b and display a virtual keypad 135 on the first touch screen 151a.

The MMS transmitting application may provide a message input region 11 and a recipient information input region 12. In addition, the MMS transmitting application may provide a function of attaching a file to an MMS message and transmitting the MMS message. As shown in FIG. 7A, the MMS transmitting application may provide an attachment region through which a file is attached in an MMS message input image. The attachment region may include an input/display box 13 for inputting an attachment or displaying the identifier of the attachment and a search icon 14 for searching for the attachment.

The virtual keypad 135 may include a plurality of soft keys representing at least one of characters, symbols and/or numerals. The soft keys may be arranged in a QWERTY key form. The controller 180 may display message contents input through the virtual keypad 135 in the message input region 11.

Figure 7B:
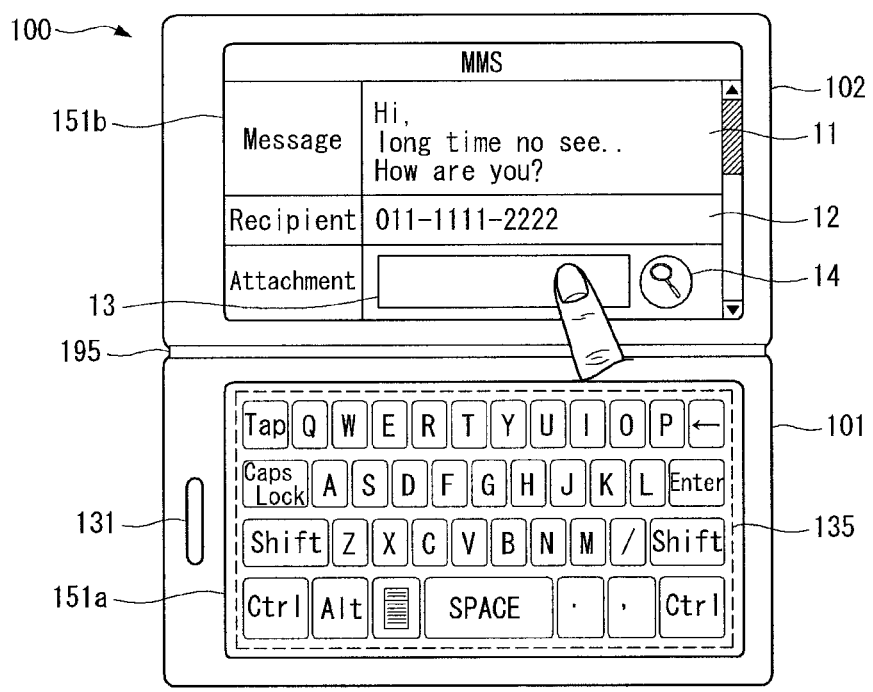
Figure 7C:
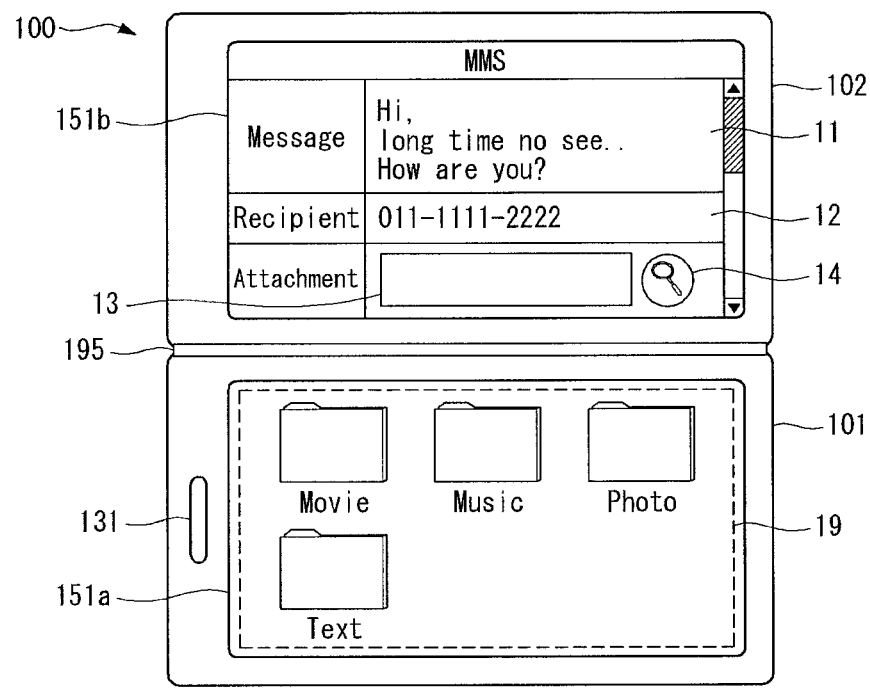

When the attachment region is touched while or after the message contents are input through the virtual keypad 135, as shown in FIG. 7B, the controller 180 may remove the virtual keypad 135 and display file folders 19 on the first touch screen 151a, as shown in FIG. 7C.

The file folders 19 may administrate files that can be attached to the MMS message and may be set in advance. The user may set or change file folders to be displayed on the first touch screen 151a when the attachment region is touched.

Figure 7D:
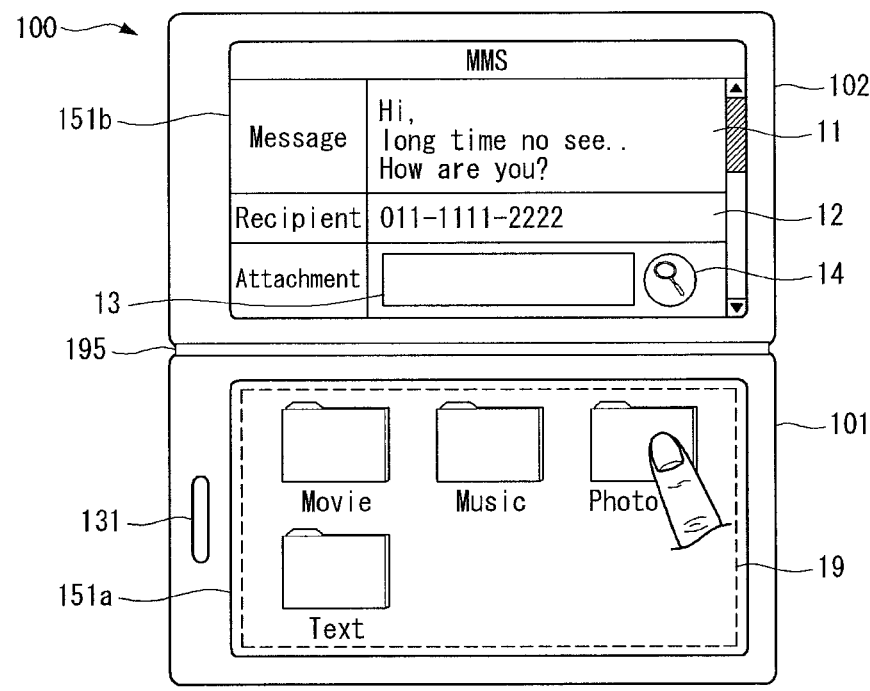

The controller 180 may receive a signal for selecting a specific folder from the file folders 19. For example, the user may touch a file folder "Photo" among the file folders 19 with his/her finger, as shown in FIG. 7D.

Figure 7E:
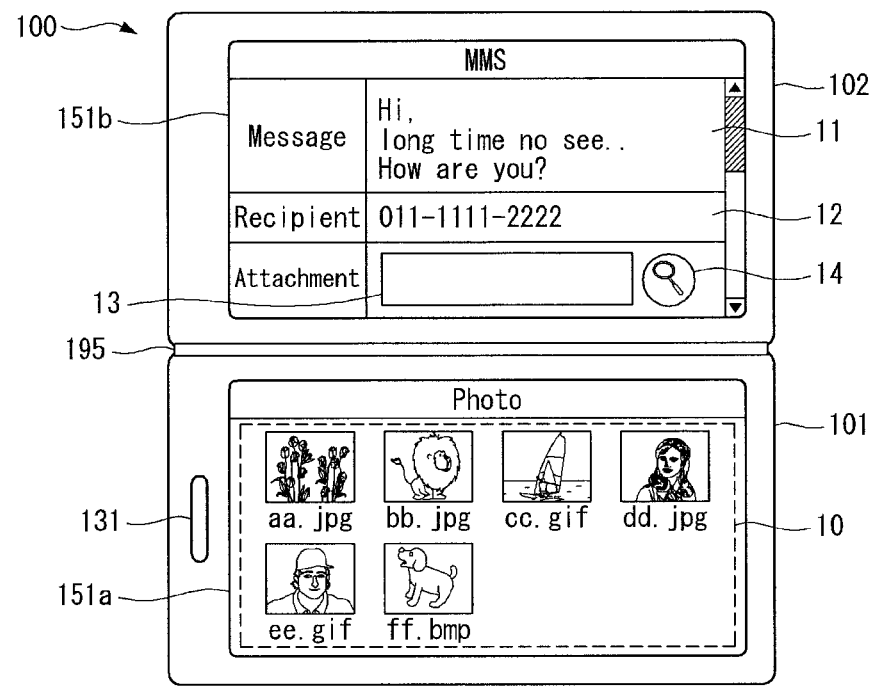

The controller 180 may display file lists included in the selected specific folder on the first touch screen 151a when receiving the signal for selecting the specific folder. For example, the controller 180 may display a photo list 10 included in the filter folder "Photo" on the first touch screen 151a, as shown in FIG. 7E. The photo list 10 may include at least one photo.

As shown in FIG. 7E, at least one photo included in the photo list 10 or the photo list 10 may correspond to the first object. The MMS transmitting apparatus or the display region 13 provided by the MMS transmitting application may correspond to the second object.

Figure 8:
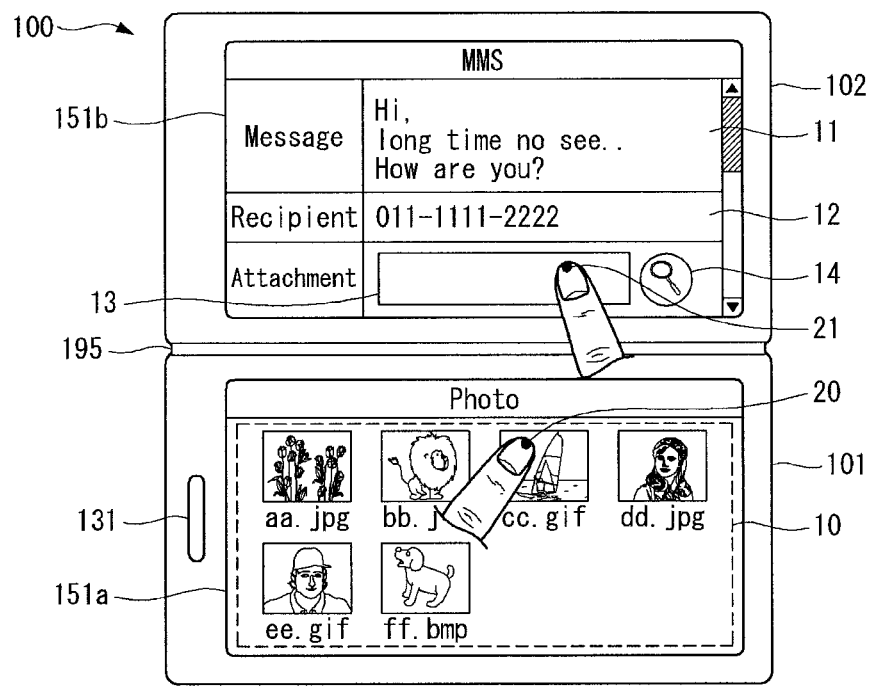
FIG. 8 illustrates images displayed on touch screens of the mobile terminal when operations S110 through S160 (FIG. 6) are performed.

FIG. 8 illustrates images displayed on the first and second touch screens 151a and 151b of the mobile terminal 100 when the operations S110 through S160 (FIG. 6) are performed. Operations S110 through S160 may be explained with reference to FIG. 8.

The controller 180 may receive, in operation S110, a first touch input 20 applied to the first object displayed on the first touch screen 151a. In FIG. 8, the first touch input 20 may be applied to a photo file "cc.gif" in the photo list 10.

The controller 10 may determine whether the first touch input 20 is maintained for a predetermined time in operation S120. The controller 180 may set, in operation S130, the first object as a source when the first touch input is maintained for the predetermined time.

The controller 180 may receive a second touch input 21 applied to the second object displayed on the second touch screen 151b while the first touch input 20 is maintained in operation S140. In FIG. 8, the second touch input 21 may be applied to the input/display region 13 for inputting an attachment or displaying the identifier of the attachment.

The controller 180 may determine whether the second touch input 21 is maintained for a predetermined time in operation S150. The controller 180 may set, in operation S160, the second object as a destination when the second touch input 21 is maintained for the predetermined time.

The controller 180 may link, in operation S170, the first object to a function corresponding to the second object when the first object is set as the source and the second object is set as the destination. The controller 180 may move, in operation S180, the first object to display the first object such that the first object corresponds to the second object.

Linking of the first object to the function corresponding to the second object may be implemented in various manners. For example, the controller 180 may use the first object for the function corresponding to the second object, move the first object to a position corresponding to the second object, activate the first object in an application corresponding to the second object or attach the first object to the second object.

Figure 9:
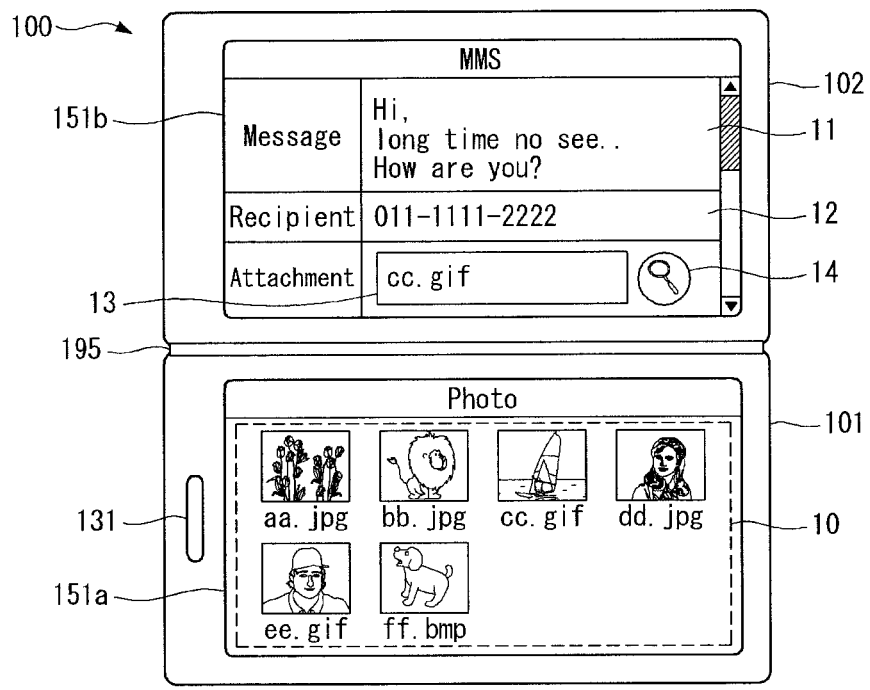
FIG. 9 illustrates images displayed on touch screens of the mobile terminal when operations S170 and S180 (FIG. 6) are performed.

FIG. 9 illustrates images displayed on the first and second touch screens 151a and 151b when the operations S170 and S180 are performed. As shown in FIG. 9, when the user operates the mobile terminal 100 as shown in FIG. 8, the controller 180 may display the photo file "cc.gif" to which the first touch input 20 is applied in the input/display region 13 in order to attach the photo file "cc.gif" to the message and send the message.

Figure 10:
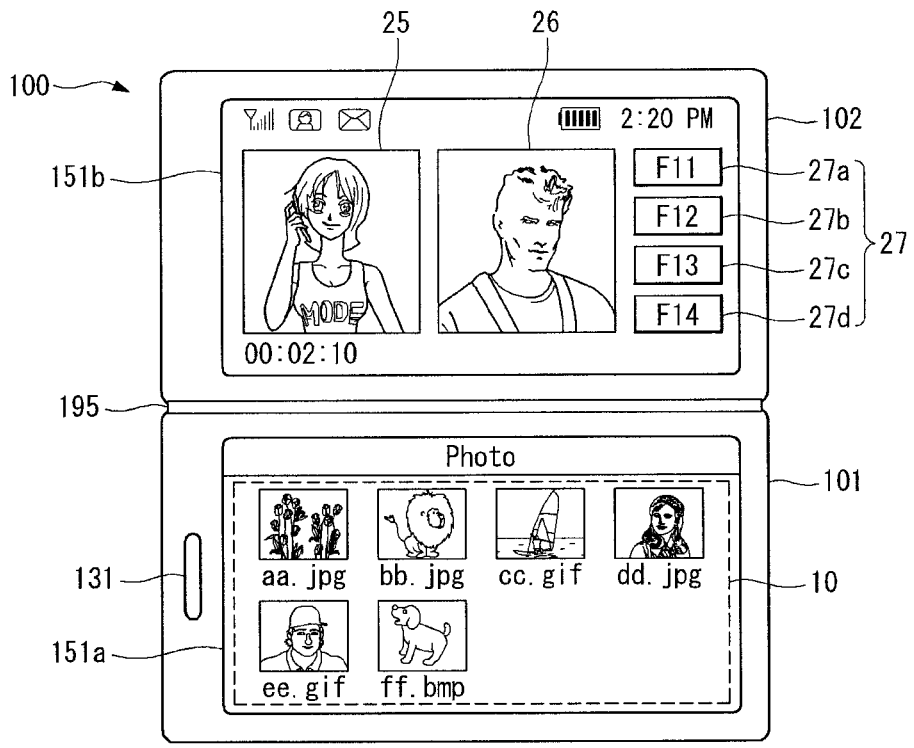
FIGS. 10 and 11 illustrate an operation of a mobile terminal according to the first example embodiment.
Figure 11:
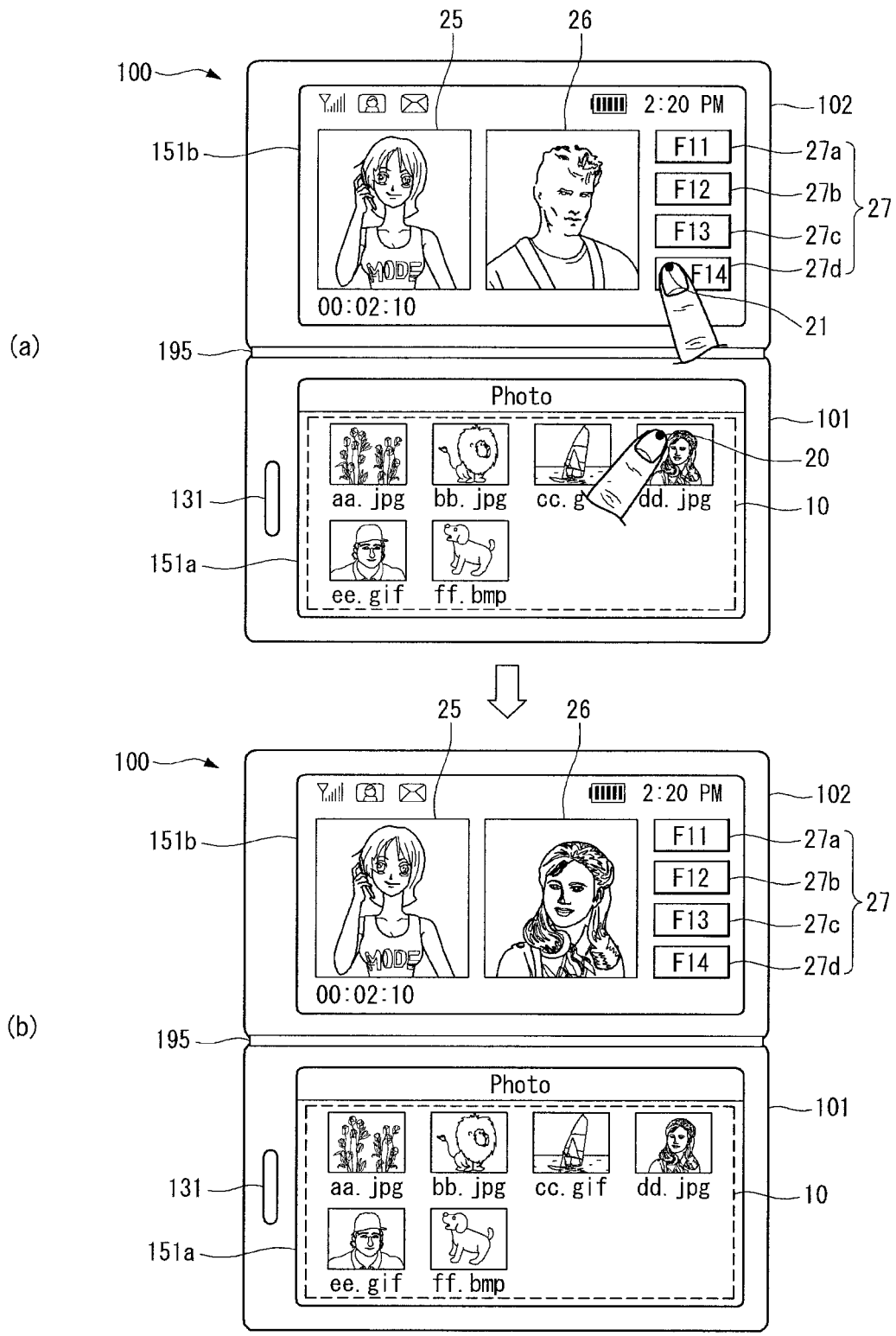

FIGS. 10 and 11 illustrate an operation of the mobile terminal 100 in accordance with the first example embodiment. The controller 180 may display the photo list 10 on the first touch screen 151a and display a video telephony application on the second touch screen 151b. FIG. 10 illustrates a situation where the user is making a video phone call using the video telephony application.

The video telephony application displayed on the second touch screen 151b may provide a user image display region 26 for displaying the image of the user of the mobile terminal 100 and a recipient display region 25 for displaying an image received from a recipient of the video phone call.

The video telephony application may provide function icons 27 corresponding to various functions required for video phone call. For example, the function icons 27 may include a menu search icon 27a, a speaker phone set/cancel icon 27b, an emotion transmission icon 27c and a substitute image transmission icon 27d.

As shown in FIG. 11, when the user touches the substitute image transmission icon 27d (which corresponds to the second touch input 21) with a right finger while touching a photo file "dd.jpg" in the photo list 10 with a left finger (which corresponds to the first touch input 20), as shown in FIG. 11(a), the controller 180 may display the photo file "dd.jpg" to which the first touch input 20 is applied in the user image display region 26 and transmit the photo file "dd.jpg" to the recipient, as shown in FIG. 11(b).

In the above embodiment and examples provided, the first touch input is applied first to the first touch screen 151a and a second touch input is thereafter applied to the second touch screen 151b. As can be appreciated, the sequence of touch input may be reversed with the same result. In other words, the first touch input may be applied first to the second touch screen 151b and a second touch input may be thereafter applied to the first touch screen 151a while the first touch input is maintained to achieve substantially the same result.

Figure 12:
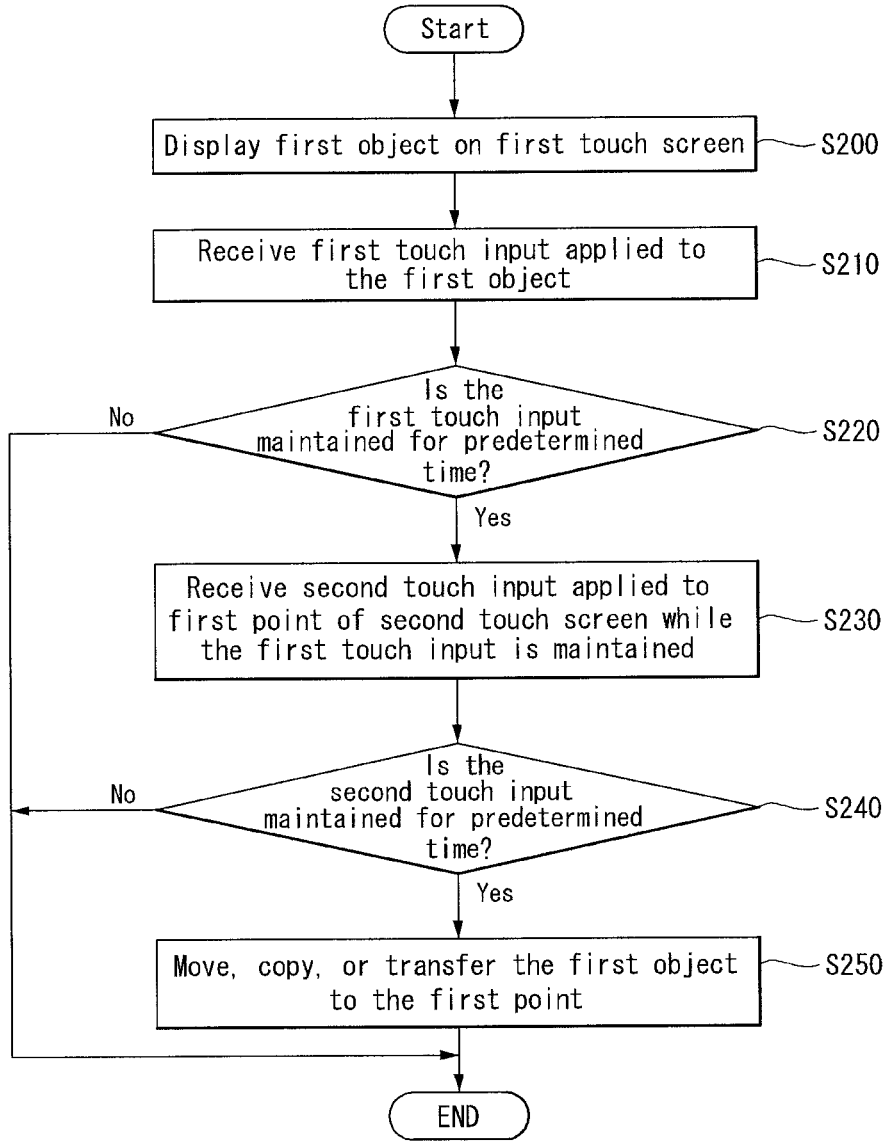
FIG. 12 is a flowchart of a method of controlling a mobile terminal according to a second embodiment.

FIG. 12 is a flowchart of a method of controlling the mobile terminal according to a second example embodiment of the present disclosure. FIGS. 13, 14, 15 and 16 illustrate an operation of the mobile terminal according to the second example embodiment. Other embodiments, configurations, operations and orders of operations are also within the scope of the present disclosure.

The controller 180 may display a first object on the first touch screen 151a in operation S200. The first object may include a menu, an icon, contents and a specific application that can be displayed.

Figure 13:
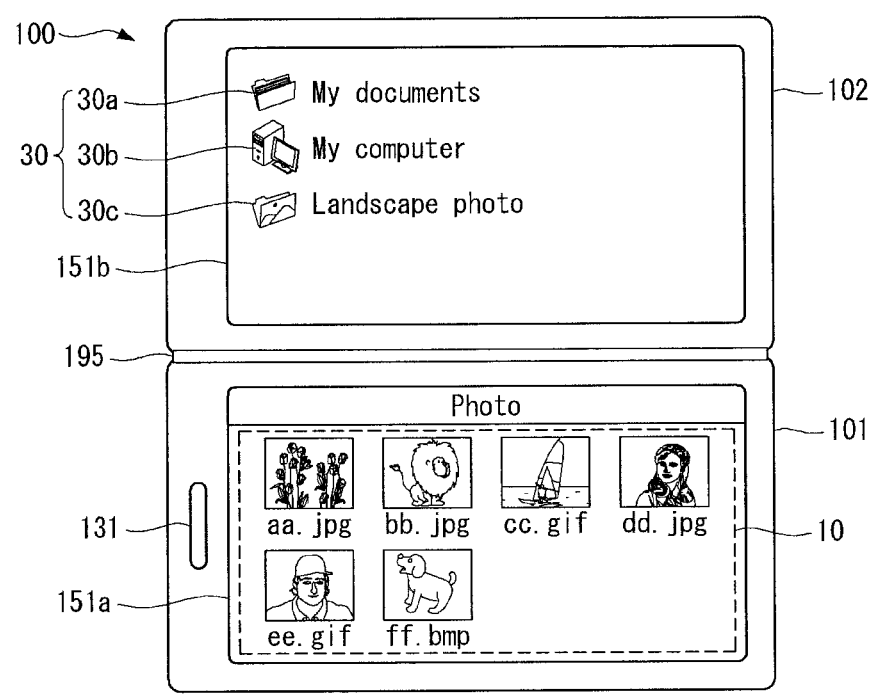
FIGS. 13, 14, 15 and 16 illustrate an operation of a mobile terminal according to the second embodiment.

FIG. 13 illustrates images displayed on the first and second touch screens 151a and 151b when the operation S200 is performed. As shown in FIG. 13, the controller 180 may display the photo list 10 including multiple photos on the first touch screen 151a. In FIG. 13, at least one photo included in the photo list 10 or the photo list 10 may correspond to the first object.

The controller 180 may also display the second object on the second touch screen 151b. As shown in FIG. 13, the controller 180 may display a plurality of icons 30 corresponding to different file folders on the second touch screen 151b.

The controller 180 may receive the first touch input 20 applied to the first object in operation S210. The operation 210 may correspond to the operation S110. For example, the first touch input 20 may be applied to the photo file "cc.gif" in the photo list 10 as shown in FIG. 14(a).

The controller 180 may determine whether the first touch input 20 is maintained for a predetermined time in operation S220. When the first touch input 20 is maintained for the predetermined time, the controller 180 may receive, in operation S230, the second touch input 21 applied to a first point on the second touch screen 151b while the first touch input 20 is maintained. The operation S230 may correspond to the operation S140. For example, the second touch input 21 may be applied to an arbitrary point on the second touch screen 151b as shown in FIG. 14(a).

The controller 180 may determine whether the second touch input 21 is maintained for a predetermined time in operation S240 and the controller 180 may move, in operation S250, the first object to the first point to which the second touch input 21 is applied when the second touch input is maintained for the predetermined time.

The controller 180 may provide the operation of moving, copying or transferring the first object to the first point visually such that the user can view a transfer of the first object to the first point.

Figure 14:
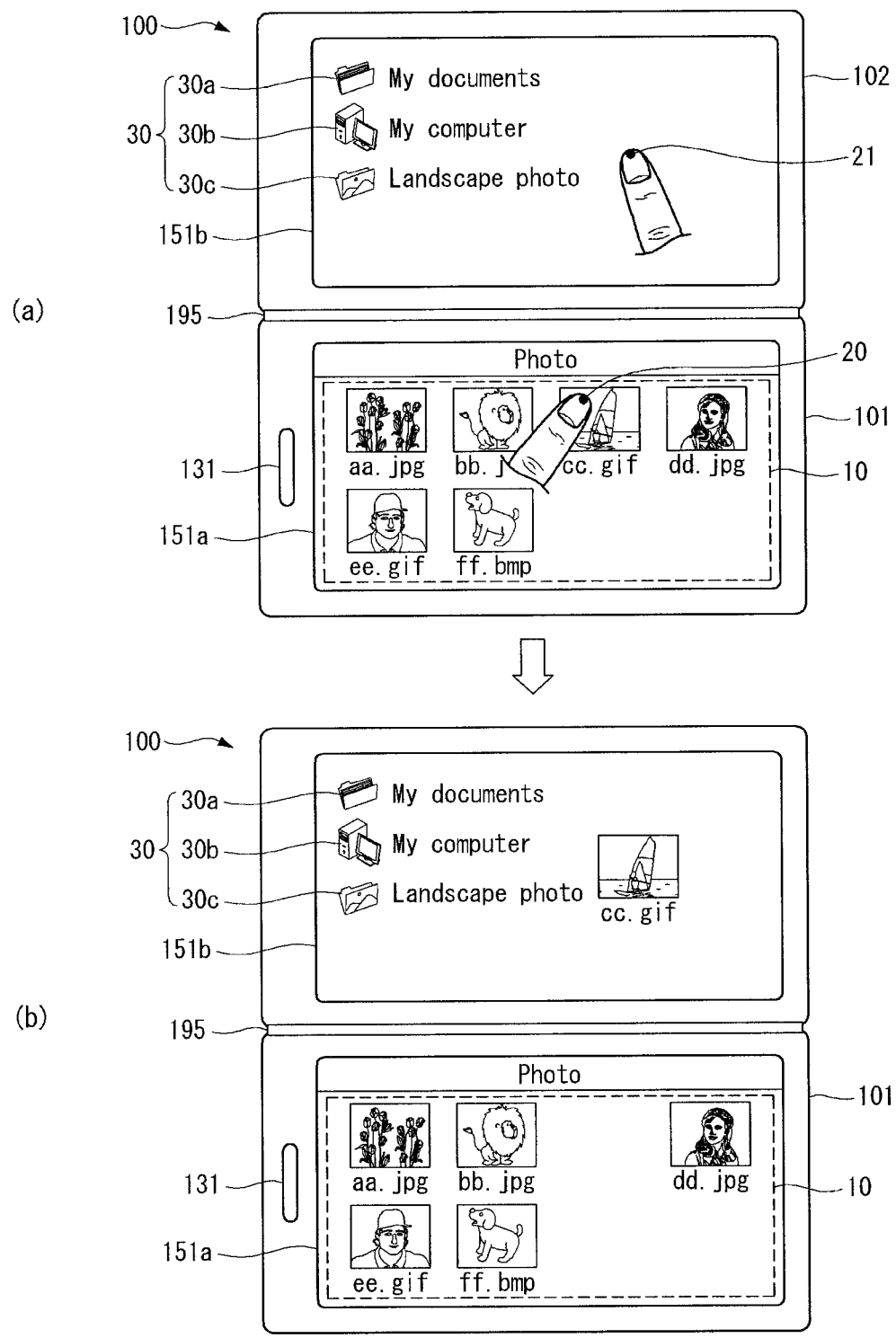

As shown in FIG. 14, as the first touch input 20 and the second touch input 21 are applied (as shown in FIG. 14 (a)), the controller 180 may move the photo file "cc.gif" to the point to which the second touch input 21 is applied, as shown in FIG. 14(b).

Figure 15:
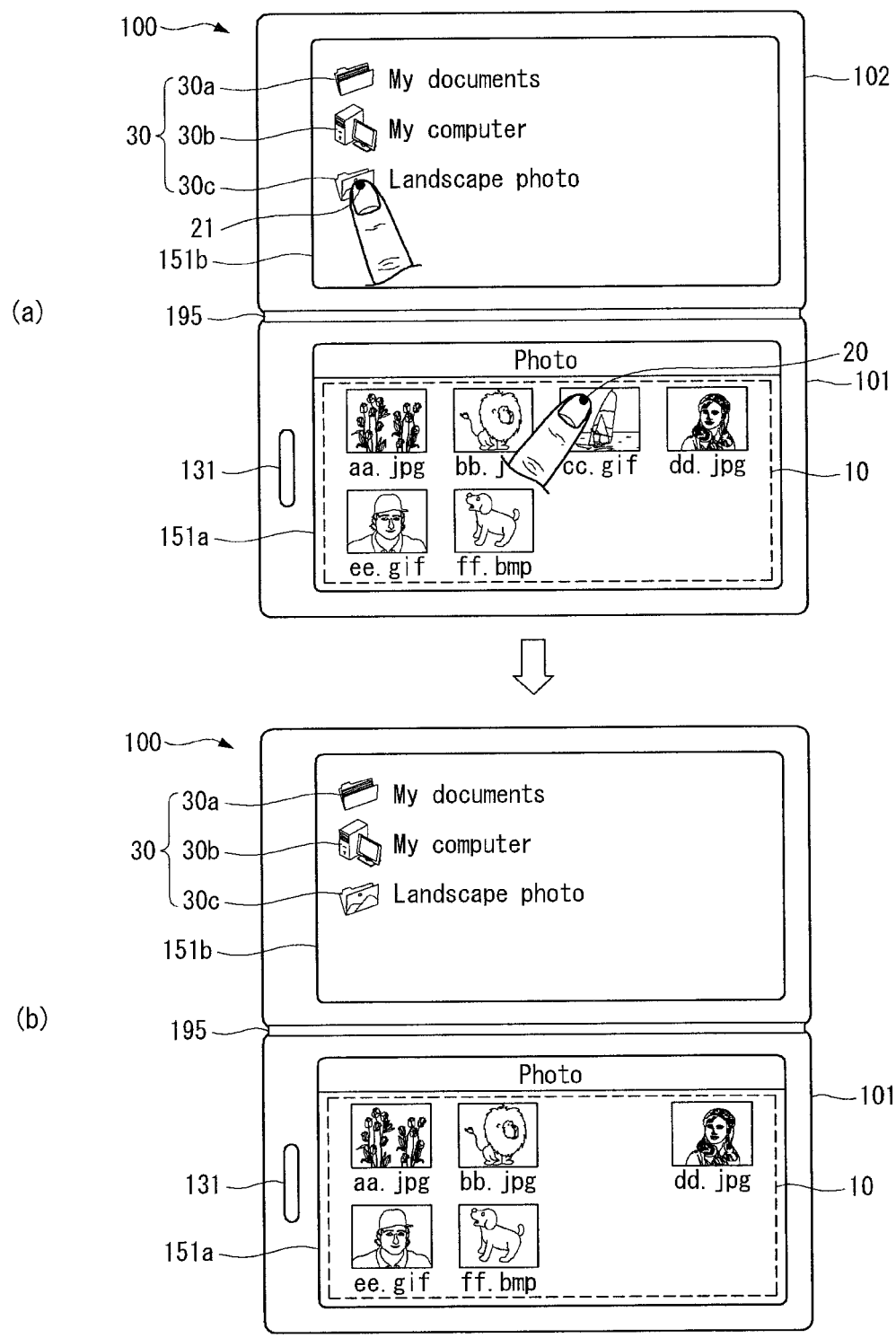

FIG. 15 illustrates an operation of the mobile terminal when the second touch input 21 is applied to an icon 30c corresponding to a specific folder "landscape photos" among the plurality of folders 30 displayed on the second touch screen 151b. When the second touch input 21 is applied to the icon 30c corresponding to the folder "landscape photos" as shown in FIG. 15 (a), the controller 180 may move the photo file "cc.gif" to the folder "landscape photos" corresponding to the icon 30c to which the second touch input 21 is applied as shown in FIG. 15 (b).

Figure 16:
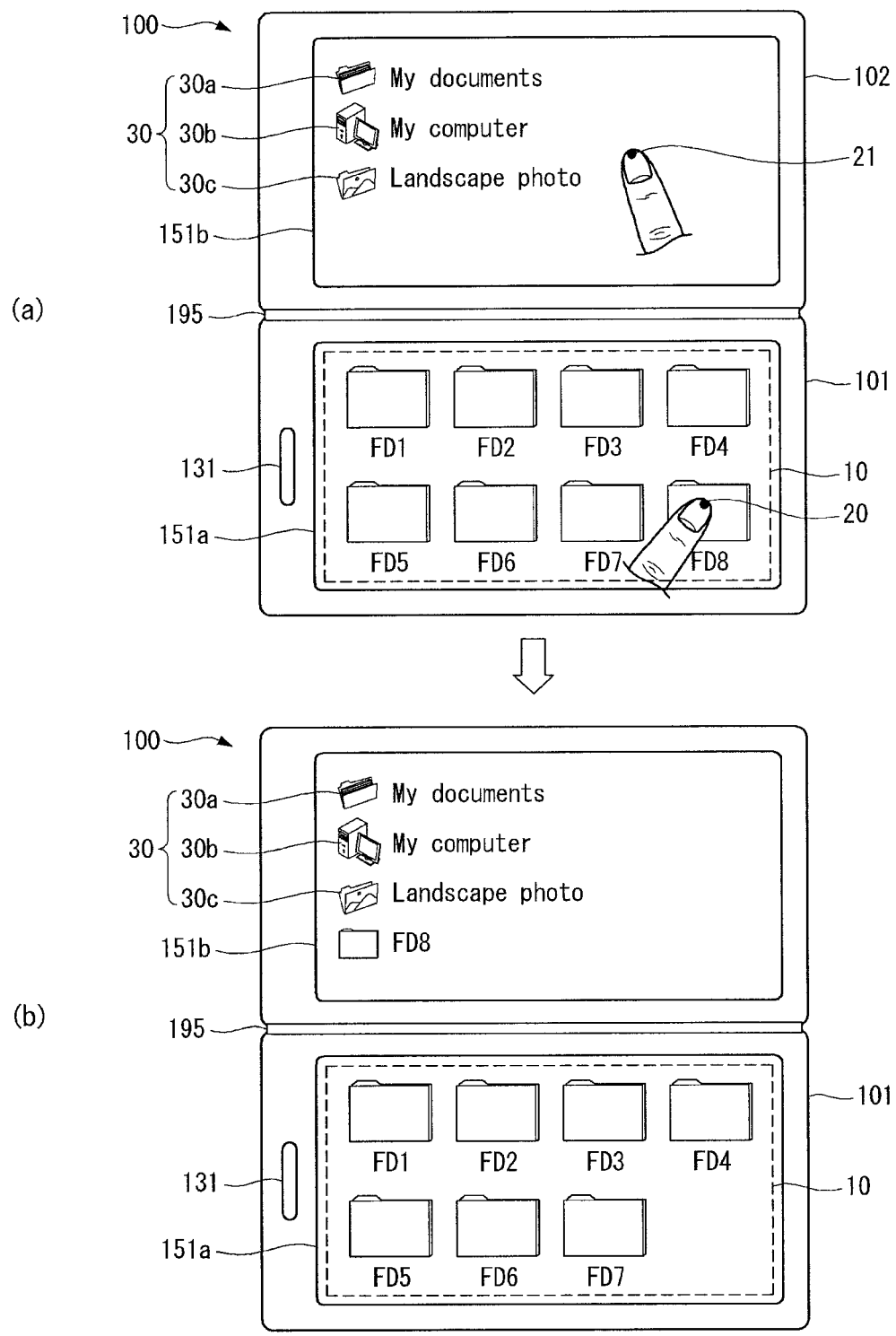

FIG. 16 illustrates an operation of the mobile terminal when a plurality of folders are displayed on the first touch screen 151a and at least one of the plurality of folders is moved to the second touch screen 151b.

As shown in FIG. 16, when the first touch input 20 is applied to a specific file folder "FD8" and the second touch input 21 is applied to an arbitrary point on the second touch screen 151b as shown in FIG. 16(a), the controller 180 may move the file folder "FD8" to the second touch screen 151b as shown in FIG. 16(b).

As shown in FIG. 16(b), the file folder "FD8" is not moved to the point to which the second touch input 21 is applied and is arranged such that it corresponds to the icons 30 previously displayed on the second touch screen 151b because the second touch screen 151b is set to a mode in which objects such as icons are automatically arranged and displayed. That is, the controller 180 may move the first object to the point to which the second touch input 21 is applied in the mode to which the second touch screen 151b is currently set.

In the above embodiment and examples provided, the first touch input is applied first to the first touch screen 151a and a second touch input is thereafter applied to the second touch screen 151b. As can be appreciated, the sequence of touch input may be reversed with the same result. In other words, the first touch input may be applied first to the second touch screen 151b and a second touch input may be thereafter applied to the first touch screen 151a while the first touch input is maintained to achieve substantially the same result.

Figure 17:
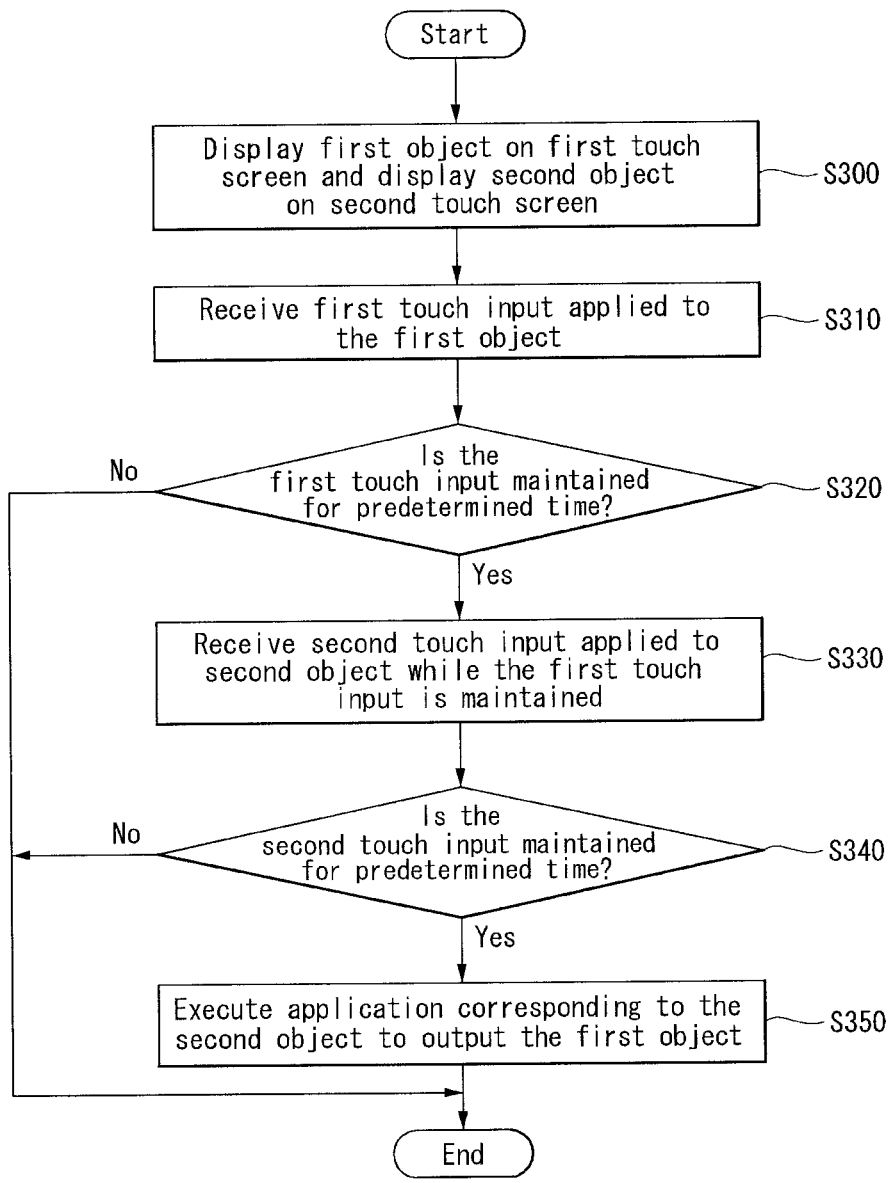
FIG. 17 is a flowchart of a method of controlling a mobile terminal according to a third embodiment.

FIG. 17 is a flowchart of a method of controlling the mobile terminal according to a third example embodiment of the present disclosure. FIGS. 18, 19, 20 and 21 illustrate an operation of the mobile terminal in accordance with the third example embodiment. Other embodiments, configurations operations and orders of operations are also within the scope of the present disclosure.

The controller 180 may display a first object on the first touch screen 151a and display a second object on the second touch screen 151b in operation S300. The operation S300 may correspond to the operation S100.

Figure 18:
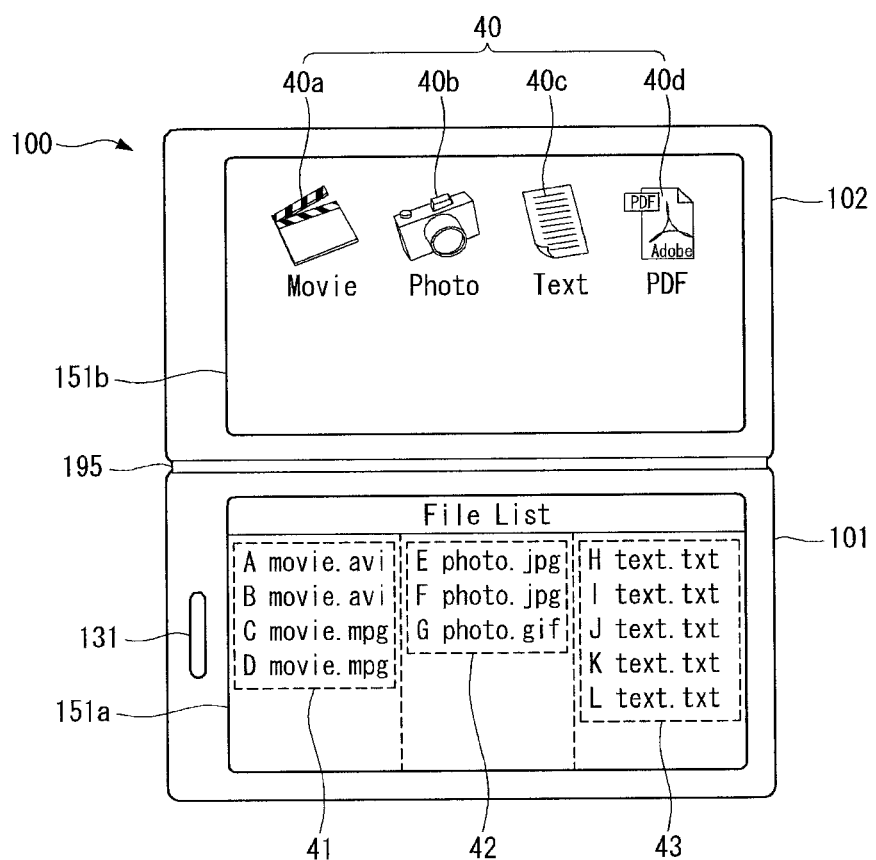
FIGS. 18, 19, 20 and 21 illustrate an operation of the mobile terminal according to the third embodiment.

FIG. 18 illustrates images displayed when the operation S300 is performed. As shown in FIG. 18, the controller 180 may display file lists 41, 42 and 43 including a plurality of files on the first touch screen 151a and display a plurality of icons 40 corresponding to different applications on the second touch screen 151b.

Each of the file lists 41, 42 and 42 may include at least one file representing specific contents. For example, the first file list 41 may include at least one moving image content file, the second file list 42 may include at least one still image content file and the third file list 43 may include at least one text content file.

The plurality of icons 40 may include a first icon 40a, a second icon 40b, a third icon 40c and a fourth icon 40d. The first icon 40a may indicate an application for reproducing moving image contents, the second icon 40b may indicate an application for reproducing still image contents, the third icon 40c may indicate an application for outputting text contents, and the fourth icon 40d may indicate an application for outputting a PDF file on the touch screen.

The controller 180 may receive the first touch input 20 applied to the first object in operation S310. The controller 180 may determine, in operation S320, whether the first touch input 20 is maintained for a predetermined time. When the first touch input 20 is maintained for the predetermined time, the controller 180 may receive, in operation S330, the second touch input 21 applied to a first point on the second touch screen 151b.

The controller 180 may determine, in operation S340, whether the second touch input 21 is maintained for a predetermined time and may drive or execute, in operation S350, an application corresponding to the second object to execute or display or output the first object when the second touch input 21 is maintained for the predetermined time.

Figure 19:
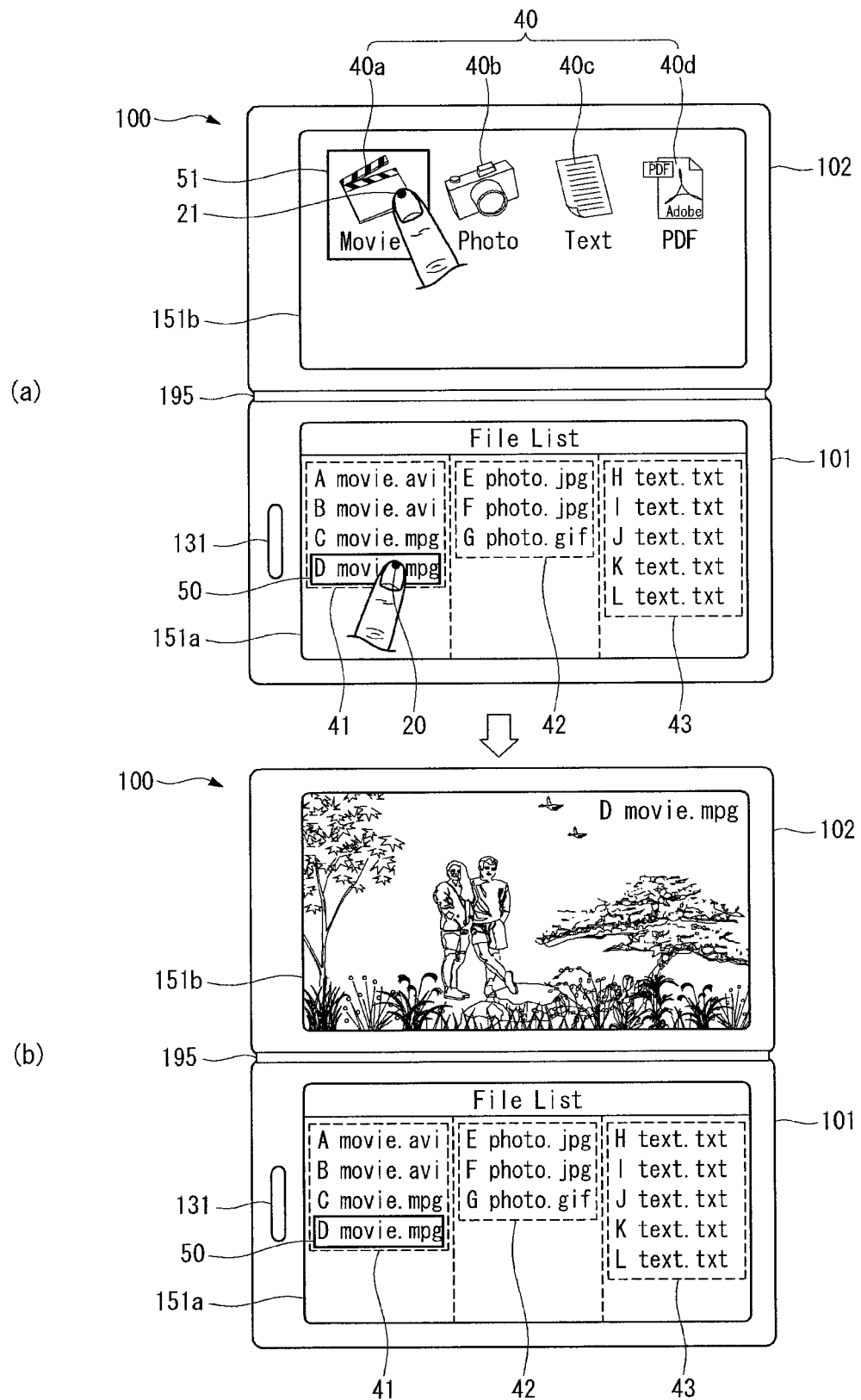
Figure 20:
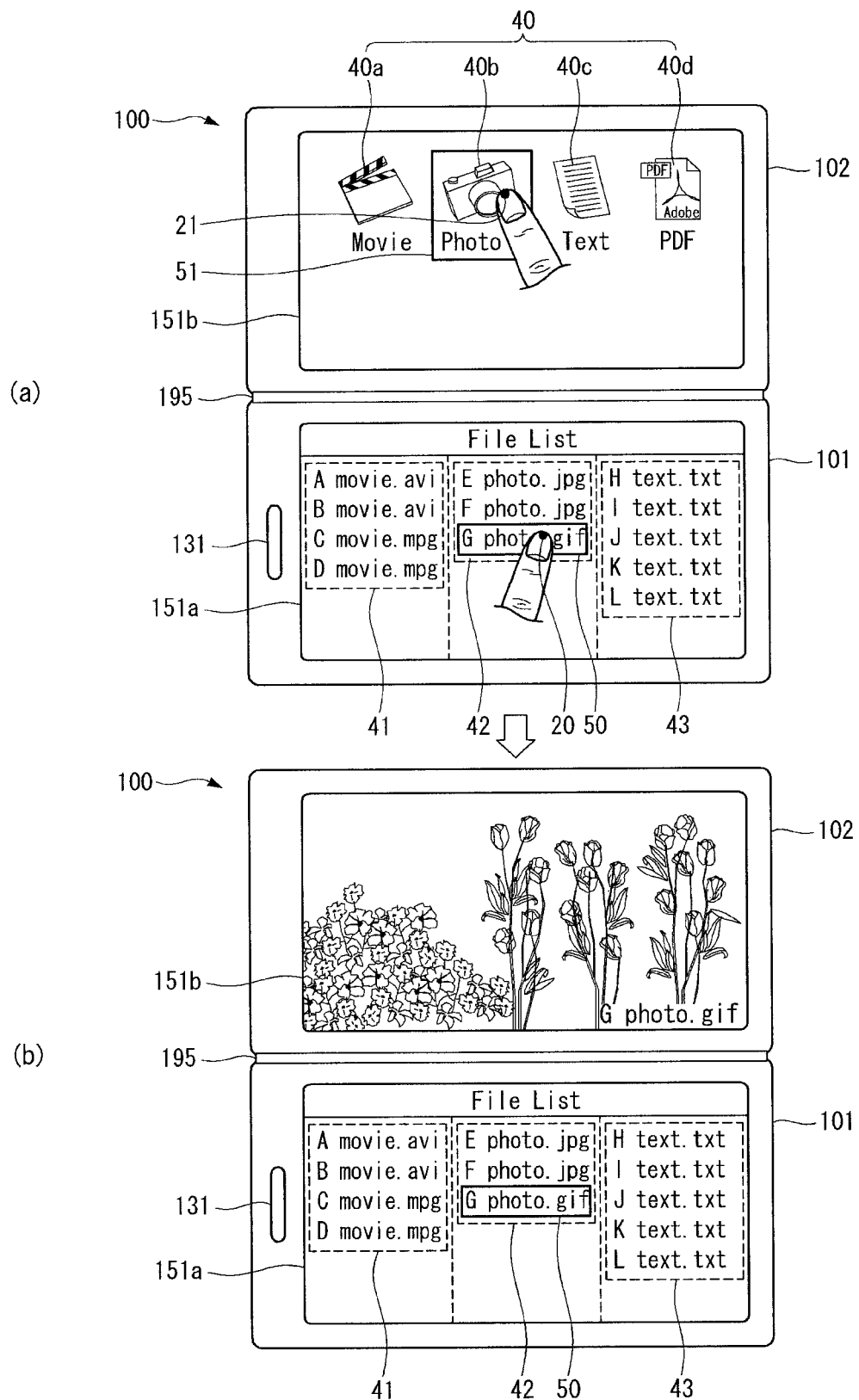
Figure 21:
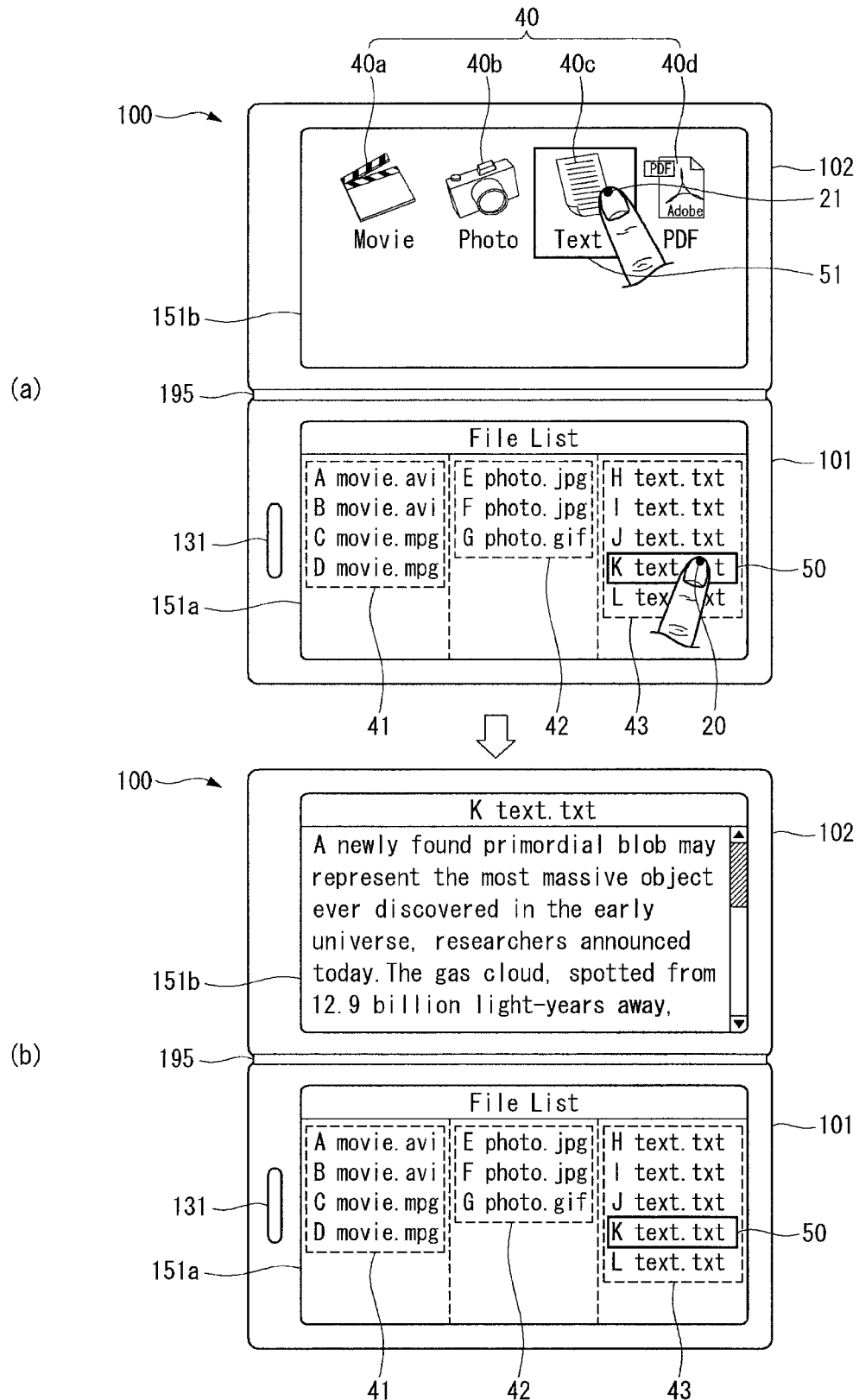

FIGS. 19, 20 and 21 illustrate an operation of the mobile terminal of the third example embodiment. FIG. 19 shows an example where a moving image application is executed to output moving image contents. FIG. 20 shows an example where a still image application is executed to output still image contents. FIG. 21 shows an example where a text application is executed to output text contents. In FIGS. 19, 20 and 21, reference numeral 50 represents an indicator that indicates a file currently selected from a plurality of files displayed on the first touch screen 151a and reference numeral 51 represents an indicator that indicates an icon currently selected from the plurality of icons displayed on the second touch screen 151b.

As shown in FIG. 19, when the controller 180 receives the second touch input 21 applied to the first icon 40a while the first touch input 20 applied to a moving image file "D movie.mpg" is maintained as shown in FIG. 19(a), the controller 180 may execute the moving image application corresponding to the first icon 40a to display the moving image corresponding to the moving image file "D move.mpg" as shown in FIG. 19(b).

As shown in FIG. 20, when the controller 180 receives the second touch input 21 applied to the second icon 40b while the first touch input 20 applied to a still image file "G photo.gif" is maintained as shown in FIG. 20(a), the controller 180 may execute the still image application corresponding to the second icon 40b to display the still image corresponding to the still image file "G photo.gif" as shown in FIG. 20(b).

As shown in FIG. 21, when the controller 180 receives the second touch input 21 applied to the third icon 40c while the first touch input 20 applied to a text file "K text.text" is maintained as shown in FIG. 21 (a), the controller 180 may execute the text application corresponding to the third icon 40c to output the text corresponding to the text file "K text.text" as shown in FIG. 21 (b).

The output moving image, still image and text may be displayed through the first touch screen 151a and/or the second touch screen 151b. FIGS. 19, 20 and 21 illustrate examples where the moving image, still image and text are displayed through the second touch screen 151b.

In the above embodiment and examples provided, the first touch input is applied first to the first touch screen 151a and a second touch input is thereafter applied to the second touch screen 151b. As can be appreciated, the sequence of touch input may be reversed with the same result. In other words, the first touch input may be applied first to the second touch screen 151b and a second touch input may be thereafter applied to the first touch screen 151a while the first touch input is maintained to achieve substantially the same result.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a first touch screen module providing a first touch screen to display a first object;
   a second touch screen module providing a second touch screen to display a second object, wherein the second touch screen module is physically separated from the first touch screen module; and
   a controller configured to:
   control the first and second touch screens,
   receive a first touch to the first object on the first touch screen,
   receive a second touch to the second object after receiving the first touch, without dragging the first object to a position on the second touch screen, wherein the first touch to the first object is maintained during a time when the second touch to the second object on the second touch screen is received, wherein the first touch and the second touch is a sequential touch on a separated touch screen module respectively,
   execute a function corresponding to the second object by associating the first object to the function corresponding to the second object when the second touch is applied to the second object displayed on the second touch screen while the first touch is maintained to the first object displayed on the first touch screen, and display an execute screen of the function on the second touch screen, wherein the first object used in the executing of the function is displayed in the first touch screen during the executing of the function.

2. The display device of claim 1, wherein the content of the first object is displayed on the second touch screen such that the content is included in the second object based on functionality of the second object.

3. The display device of claim 1, wherein the display device is provided on a mobile terminal, the first touch screen is included in a first body of the mobile terminal and the second touch screen is included in a second body of the mobile terminal, and the mobile terminal comprises a hinge such that the first body is foldable relative to the second body.

4. The display device of claim 3, wherein when the first body and the second body are in a closed status, the first touch screen faces in an opposite direction from the second touch screen and in a fully open status, the first touch screen and the second touch screen face in substantially a same direction.

5. The display device of claim 1, wherein the first object corresponds to an icon and a file including one of a text, a still image or a moving image, and the second object corresponds to one of a background picture, an icon and a specific application.

6. The display device of claim 5, wherein the specific application includes one of an application for managing files, an application for managing messages or e-mail, an application for audio telephony or video telephony and an application for outputting multimedia contents.

7. The display device of claim 1, wherein the first object is transferred to the second touch screen and displays the first object on the second touch screen.

8. The display device of claim 7, wherein the controller to visually provide the transfer of the first object to the second touch screen.

9. The display device of claim 1, wherein the first touch screen is provided on a first touch panel and the second touch screen is provided on a second touch panel, the first and second touch panel being movable relative to each other.

10. A method of controlling a first touch screen and a second touch screen, the method comprising:

displaying a first object on the first touch screen provided in a first touch screen module;

displaying a second object on the second touch screen provided in a second touch screen module, wherein the second touch screen module is a different module from the first touch screen module;

receiving a first touch to the first object on the first touch screen;

receiving a second touch on the second object after receiving the first touch, wherein the first touch is maintained to the first object during a time when the second touch to a position on the second touch screen is received, wherein the first touch and the second touch is a sequential touch on a separated touch screen module respectively, and executing a function corresponding to the second object by linking the first object to the function corresponding to the second object when the second touch is applied to the second object displayed on the second touch screen without dragging the first object to the second object on the second touch screen while the fust touch is maintained to the first object displayed on the first touch screen; and displaying an execute screen of the function on the second touch screen, wherein the first object used in the executing of the function is displayed in the first touch screen during the executing of the function.

11. The display device of claim 1, wherein the controller is configured to display the content of the first object on a specific area of the second touch screen, wherein the specific area is an area predetermined for providing a function corresponding to the second object.

12. The display device of claim 1, wherein a second object is provided at the destination position on the second touch screen, and the controller links the first object to a function corresponding to the second object when the second touch is applied to the second object displayed on the second touch screen while the first touch is maintained to the first object.

13. The display device of claim 1, wherein the controller associates the first object to the function corresponding to the second object includes one of:

moving the first object to a position corresponding to the second object;

activating the first object in an application corresponding to the second object; or attaching the first object to the second object.

14. The display device of claim 10, wherein linking the first object to the function corresponding to the second object includes one of:

moving the first object to a position corresponding to the second object;

activating the first object in an application corresponding to the second object; or attaching the first object to the second object.

15. The display device of claim 1, wherein the controller is configured to move or copy the first object from the first touch screen to a destination position on the second touch screen without dragging the first object to the destination position on the second touch screen.

* * * * *